June 16, 1936.  C. M. WENDT ET AL  2,044,488
COMBINED CAR HEATER AND WINDSHIELD CLEANER
Filed Nov. 8, 1934
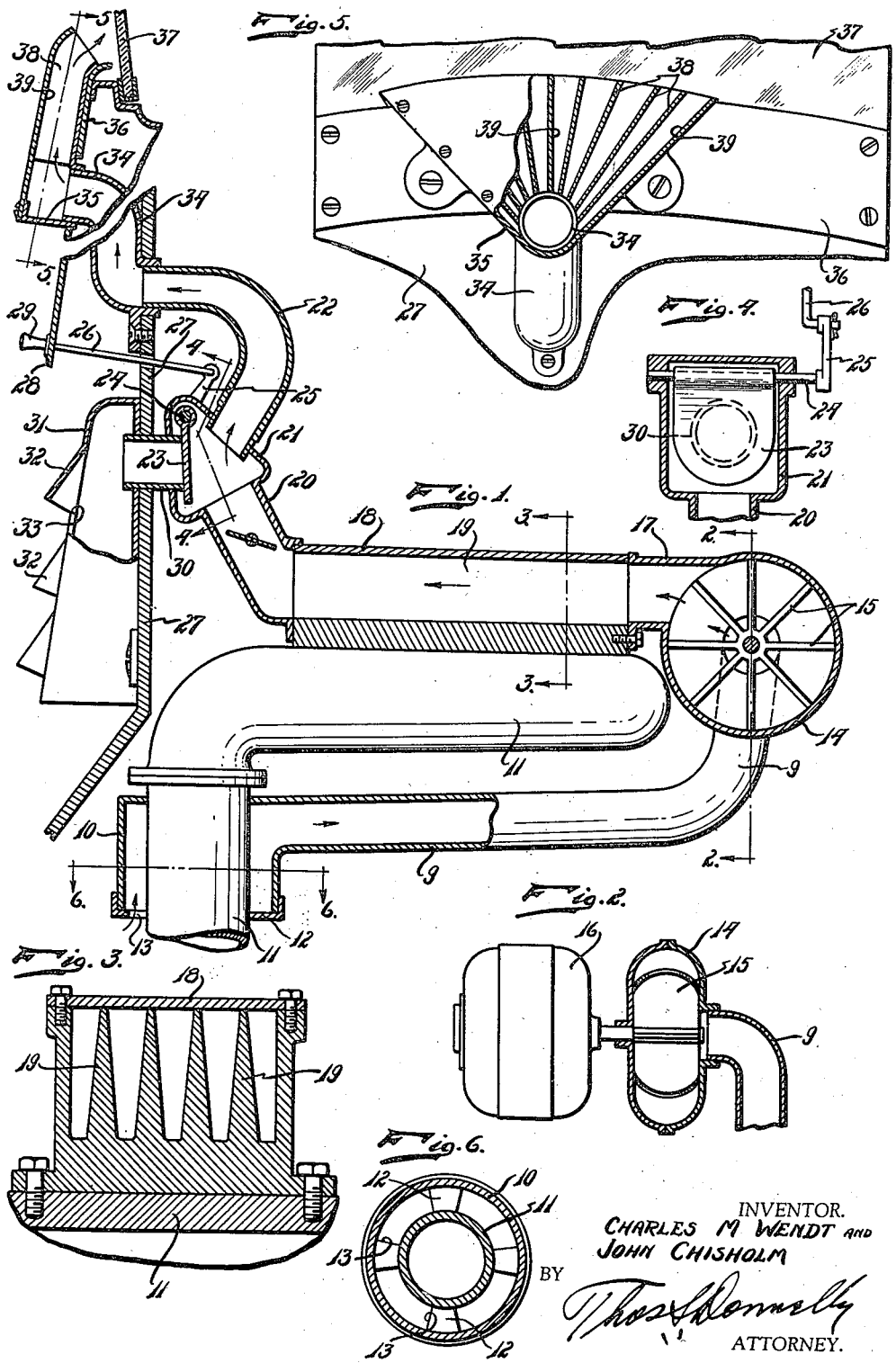
INVENTOR.
CHARLES M WENDT AND
JOHN CHISHOLM
BY
ATTORNEY.

Patented June 16, 1936

2,044,488

UNITED STATES PATENT OFFICE 2,044,488

COMBINED CAR HEATER AND WINDSHIELD CLEANER

Charles M. Wendt, Flint, and John Chisholm, Grand Blanc, Mich.

Application November 8, 1934, Serial No. 752,048

2 Claims. (Cl. 20—40.5)

Our invention relates to a new and useful improvement in a combination car heater and windshield cleaner, and has for its object the provision of a device which may be utilized by the proper operation either for heating the interior of a vehicle body or for heating the windshield so as to maintain the same free of accumulations from sleet, snow and the like.

Another object of the invention is a provision of a device of this class which will be simple of structure, economical of manufacture, durable and highly efficient in use, compact, and easily installed.

Other objects will appear hereinafter.

The invention consists in the combination of and arrangement of parts hereinafter described and claimed.

The invention will be best understood by a reference to the accompanying drawing which forms a part of this specification, and in which, Fig. 1 is a central vertical sectional view of the invention showing it installed.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 1.

Fig. 6 is a sectional view taken on line 6—6 of Fig. 1.

As shown in the drawing the invention comprises a conduit 9 having an enlarged end portion 10 which embraces the exhaust manifold 11 of an engine with which used. This portion 10 is secured in position by the collar 12 having air inlet openings 13 formed therein. The conduit 9 communicates with a blower housing 14 having the fan 15 mounted therein and operated by the electric motor 16. An outlet conduit 17 communicates the housing with the interior of the heater 18 which is mounted on the top of the exhaust manifold 11, and in which are formed the partition walls 19. An outlet conduit 20 communicates with the heater housing 18 and leads to the control housing 21. Communicating with the valve housing 21 is a conduit 22, the end of which may be closed by the flap valve 23. This flap valve 23 is fixedly mounted on the rod 24, to which is fixedly attached the arm 25. This arm 25 is connected to the rod 26 which projects through the dash 27 of the vehicle, and through the instrument board 28. The end of the rod is provided with a knob 29. The construction is such that the flap 23 may be moved to engage the end of the conduit 22 so as to close the same and permit the hot air, driven through the conduit 20, to pass through the neck 30 into the distributing housing 31, from which are punched the louvres so that the air may pass through the slits 33 and serve as a means for heating the interior of the car. In the position shown in Fig. 1 the flap valve 23 is serving as a closure for the end of the sleeve 30 so that the hot air travels in the path of the arrows and passes through the conduit 22 into the conduit 34 from which it passes into the housing 35 mounted on the frame 36 of the windshield 37. This housing 35 is provided with partitions 38 to form the diverging passageways 39 so that the hot air may issue against the windshield 37 and serve to maintain it sufficiently heated to prevent the accumulation of sleet, snow and the like thereon.

The partitions 18 serve as conductors to conduct heat from the manifold 11 and as the air passes through the housing 18 it becomes sufficiently heated for the purposes intended.

It is thus seen that we have provided a simple and effective means of heating either the interior of the body of a vehicle or the windshield to prevent accumulation of foreign material thereon.

While we have illustrated and described the preferred forms of construction we do not wish to limit ourselves to the precise details of structure but desire to avail ourselves of such variations and modifications as come within the scope of the appended claims.

Having thus described our invention what we claim as new and desire to secure by Letters Patent is:

1. In a device of the class described, a housing; a pair of conduits communicating with said housing and terminating at said housing; a flap valve movable into position for closing the end of either of said conduits; means for moving said flap valve to either of said positions; a distributing housing mounted on the other end of said conduits; louvres punched from said distributing conduits and inclined downwardly so as to direct fluid issuing therefrom in a downward direction.

2. In a device of the class described, a housing; a pair of conduits communicating with said housing and terminating at said housing; a flap valve movable into position for closing the end of either of said conduits; means for moving said flap valve to either of said positions; a distributing housing mounted on the other end of said conduits; louvres punched from said distributing conduits and inclined downwardly so as to direct fluid issuing therefrom in a downward direction; and a distributing housing mounted on the other end of the other of said conduits; and a plurality of partitions in said second named distributing housing for dividing the same into a plurality of chambers.

CHARLES M. WENDT.
JOHN CHISHOLM.